United States Patent
Boyd

(10) Patent No.: US 7,505,459 B2
(45) Date of Patent: Mar. 17, 2009

(54) METHOD AND APPARATUS FOR SWITCHING PACKETS IN A PASSIVE OPTICAL NETWORK

(75) Inventor: Edward W. Boyd, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 793 days.

(21) Appl. No.: 10/814,929

(22) Filed: Mar. 30, 2004

(65) Prior Publication Data

US 2005/0220129 A1 Oct. 6, 2005

(51) Int. Cl.
*H04L 12/28* (2006.01)

(52) U.S. Cl. ............... 370/389; 370/397; 370/399; 370/395.21; 370/395.3; 370/395.32; 370/409; 370/428

(58) Field of Classification Search ........... 370/389, 370/397, 399, 395.21, 395.3, 395.32
See application file for complete search history.

(56) References Cited

U.S. PATENT DOCUMENTS

| | | | | |
|---|---|---|---|---|
| 5,884,297 | A * | 3/1999 | Noven ............... | 370/395.3 |
| 6,034,958 | A * | 3/2000 | Wicklund ........... | 370/395.32 |
| 6,546,391 | B1 * | 4/2003 | Tsuruoka ............ | 707/8 |
| 6,904,057 | B2 * | 6/2005 | Sarkinen et al. ..... | 370/469 |
| 7,212,495 | B2 * | 5/2007 | Karri et al. ......... | 370/238 |
| 7,313,633 | B2 * | 12/2007 | Beverly ............... | 709/245 |
| 7,313,667 | B1 * | 12/2007 | Pullela et al. ........ | 711/202 |
| 2003/0117998 | A1 * | 6/2003 | Sala et al. ............ | 370/351 |
| 2003/0189937 | A1 * | 10/2003 | Kawasaki ........... | 370/395.32 |
| 2004/0057437 | A1 * | 3/2004 | Daniel et al. ........ | 370/395.43 |
| 2005/0175010 | A1 * | 8/2005 | Wilson et al. ....... | 370/392 |

* cited by examiner

*Primary Examiner*—Edan Orgad
*Assistant Examiner*—Wutchung Chu
(74) *Attorney, Agent, or Firm*—Park, Vaughan & Fleming LLP; Shun Yao

(57) ABSTRACT

One embodiment of the present invention provides a system that performs packets switching in a passive optical network which includes a central node and at least one remote node. After receiving a packet, the system obtains a first set of results by performing a first lookup based on a first set of values derived from the packet. The system also obtains a second set of results by performing a second lookup based on a second set of values derived from the packet. Next, the system merges the first set of results and the second set of results, and produces a merged value. The system then obtains a subsequent result by performing a subsequent lookup with the merged value. If the packet is a downstream packet, the system derives a logical identifier corresponding to one or more remote nodes from the subsequent result. The system then incorporates the logical identifier into the packet and transmits the packet to one or more remote nodes.

36 Claims, 9 Drawing Sheets

METHOD AND APPARATUS FOR SWITCHING PACKETS IN A PASSIVE OPTICAL NETWORK

BACKGROUND

1. Field of the Invention

The present invention relates to packet switching in communication networks. More specifically, the present invention relates to a method and apparatus for switching packets in a passive optical network.

2. Related Art

In order to keep pace with increasing Internet traffic, optical fibers and optical transmission equipment have been widely deployed to substantially increase the capacity of backbone networks. However, this capacity increase in backbone networks has not been matched by a corresponding capacity increase in access networks. Even with broadband access solutions, such as digital subscriber line (DSL) and cable modem (CM), the limited bandwidth offered by current access networks creates a severe bottleneck in delivering high bandwidth to end users.

Among the different technologies presently being developed, Ethernet passive optical networks (EPONs) are among the best candidates for next-generation access networks. EPONs combine ubiquitous Ethernet technology with inexpensive passive optics. They offer the simplicity and scalability of Ethernet with the cost-efficiency and high capacity of passive optics. Because of optical fiber's high bandwidth, EPONs can support broadband voice, data, and video traffic simultaneously. Such integrated services are difficult to provide with DSL or CM technology. Furthermore, EPONs are more suitable for Internet Protocol (IP) traffic, since Ethernet frames can encapsulate native IP packets with different sizes, whereas ATM passive optical networks (APONs) use fixed-size ATM cells and require packet fragmentation and reassembly.

Typically, EPONs are used in the "first mile" of the network, which provides connectivity between the service provider's central offices and business or residential subscribers. This first mile network is a logical point-to-multipoint network, with a central office servicing a number of subscribers. In a typical tree-topology EPON, one fiber couples the central office to a passive optical coupler, which divides and distributes downstream optical signals to subscribers. The coupler also combines upstream signals from subscribers (see FIG. 1).

Transmissions in an EPON are typically between an optical line terminal (OLT) and optical networks units (ONUs) (see FIG. 2). The OLT generally resides in the central office and couples the optical access network to an external network (e.g., a carrier network). An ONU can be located either at the curb or at an end-user location, and can provide broadband voice, data, and video services. ONUs are typically coupled to a one-by-N (1×N) passive optical coupler, and the passive optical coupler is coupled to the OLT through a single optical link. (Note that a number of optical couplers can be cascaded.) This configuration can achieve significant savings in the number of fibers and amount of hardware.

Communications within an EPON are divided into downstream traffic (from OLT to ONUs) and upstream traffic (from ONUs to OLT). In the upstream direction, the ONUs share channel capacity and resources, since there is only one link coupling the passive optical coupler with the OLT. In the downstream direction, because of the broadcast nature of the 1×N passive optical coupler, packets are broadcast by the OLT to all ONUs and are subsequently extracted by their destination ONUs. Each network device attached to a certain ONU is assigned a Logical Link ID (LLID), according to the IEEE 802.3ah standard. A downstream packet is first processed at the OLT, where the packet receives the LLID of its destination, and is then transmitted to the ONUs. Although a packet is broadcast to all the ONUs, only the ONUs with an LLID that matches the one with the packet is allowed to receive the packet. Therefore, the OLT switches packets by attaching proper LLIDs to the packets.

The OLT is responsible for processing and forwarding both upstream and downstream packets. Because the links in EPONs may operate at high speeds (e.g., 1 Gbps and above), the OLT bears the burden of processing a large number of packets at line speed. Furthermore, customers often request virtual local area network (VLAN) services. The additional VLAN packet processing adds to OLT's workload.

Hence, what is needed is a method and apparatus for switching packets in a passive optical network, which can process packets at line speed and implement various forwarding policies cost-effectively.

SUMMARY

One embodiment of the present invention provides a system that performs packets switching in a passive optical network which includes a central node and at least one remote node. After receiving a packet at the central node, the system first obtains a first set of results by performing a first lookup based on a first set of values derived from the packet. The system also obtains a second set of results by performing a second lookup based on a second set of values derived from the packet. Next, the system merges the first set of results and the second set of results, and produces a merged value. The system then obtains a subsequent result by performing a subsequent lookup with the merged value. If the packet is a downstream packet, the system derives a logical identifier corresponding to one or more remote nodes from the subsequent result. The system then incorporates the logical identifier into the packet, and transmits the packet to one or more remote nodes.

In a variation of this embodiment, the first lookup involves directly addressing one or more entries of a direct-search table by offsetting one or more base addresses based on the first set of values.

In a further variation, the direct-search table is divided into four sub-tables, each of which starts at a corresponding base address. Two of the four sub-tables are used if the packet is an upstream packet, and the other two of the four sub-tables are used if the packet is a downstream packet.

In a further variation, the first set of values includes a virtual local area network (VLAN) identifier of the packet.

In a variation of this embodiment, the second lookup involves linearly searching one or more linear-search tables based on the second set of values, wherein the second set of values includes a number of bits extracted from the packet.

In a variation of this embodiment, the system produces a third set of results by performing a third lookup based on a third set of values derived from the packet, wherein producing the merged value involves merging the first, second, and third sets of results.

In a further variation, the third lookup involves a binary search through a working binary-search table based on the third set of values.

In a further variation, if the packet is a downstream packet, the third set of values includes a destination media access control (MAC) address of the packet. If the packet is an upstream packet, the third set of values includes a source MAC address of the packet.

In a further variation, if the packet is an upstream packet and if the binary-search table does not contain an entry corresponding to the packet's source MAC address, the system inserts a new entry into the working binary-search table based on the packet's source MAC address, wherein the key of the new entry is derived from the packet's source MAC address.

In a further variation, if there is no space left in the working binary-search table for inserting the new entry, the system populates a shadow binary-search table with existing entries in the working binary-search table and the new entry, such that the distribution of entries in the shadow binary-search table is more balanced than the working binary-search table. The system then converts the shadow binary-search table to an updated working binary-search table, and converts the prior working binary-search table to a shadow binary-search table.

In a further variation, each of the first, second, and third sets of results includes a discard value, a quality of service (QoS) value, a destination value, and three priority numbers setting the priority of the discard value, QoS value, and destination value, respectively. The QoS value and destination value are used to produce the merged value. The discard value indicates whether the merged value should be discarded.

In a further variation, to merge the first, second, and third sets of results and to produce the merged value, the system selects the discard value, QoS value, and destination value with the highest priority among all the results. If there is a tie in the priority associated with a value, the system performs a logical "OR" operation among the tying values and sets the corresponding value to the "OR" result. The system then combines the selected QoS value and destination value to produce the merged value. If the selected discard filed indicates that the merged value should be discarded, the system discards the merged value.

In a variation of this embodiment, the subsequent result includes a queue index which specifies a queue where the packet can be stored before the packet is transmitted.

In a variation of this embodiment, the subsequent result includes a logical identifier which specifies one or more remote nodes to which the packet is destined if the packet is a downstream packet.

In a variation of this embodiment, the subsequent result includes a VLAN identifier.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium.

Passive Optical Network Topology

Figure 1:
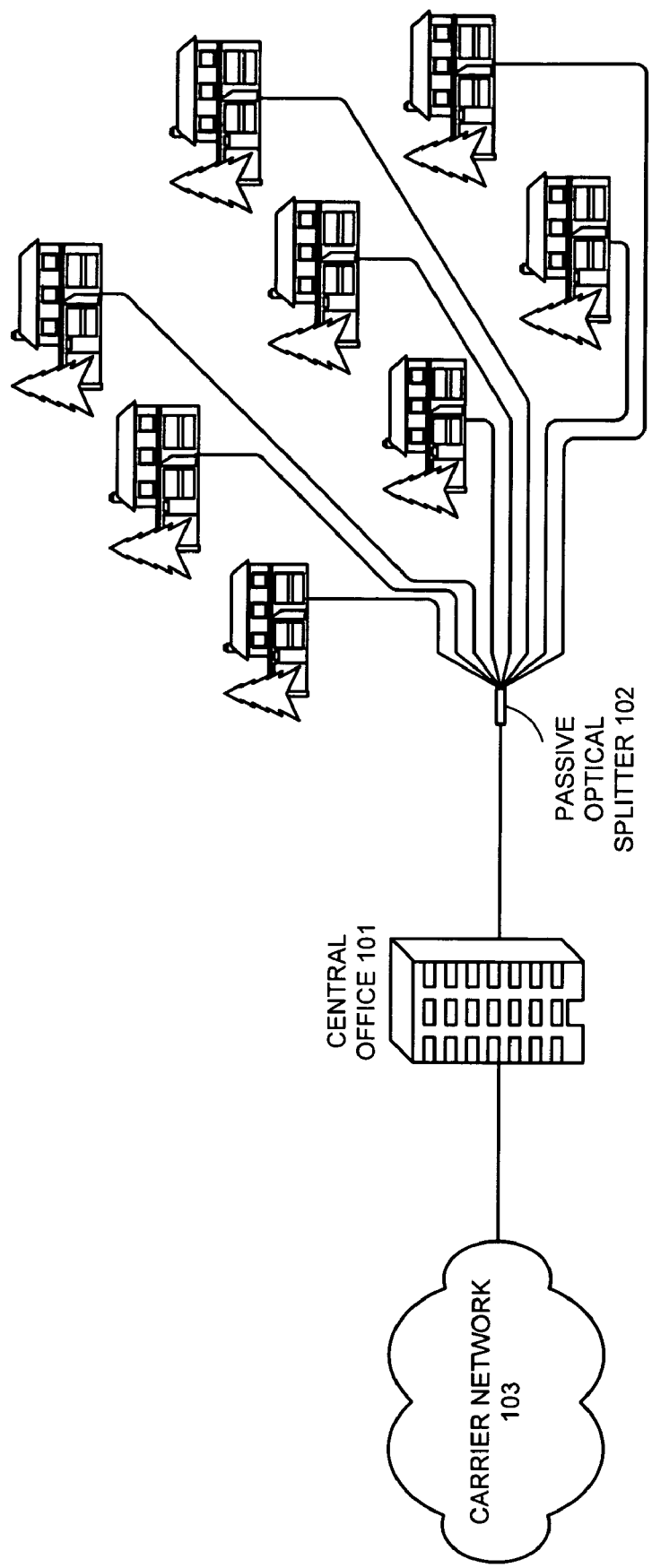
FIG. 1 illustrates a passive optical network wherein a central office and a number of subscribers are coupled through optical fibers and a passive optical splitter (prior art).

FIG. 1 illustrates a passive optical network, wherein a central office and a number of subscribers form a tree topology through optical fibers and a passive optical splitter (prior art). As shown in FIG. 1, a number of subscribers are coupled to a central office 101 through optical fibers and a passive optical splitter 102. Passive optical splitter 102 can be placed near end-user locations, so that the initial fiber deployment cost is minimized. The central office is coupled to an external network, such as a metropolitan area network operated by an ISP.

Figure 2:
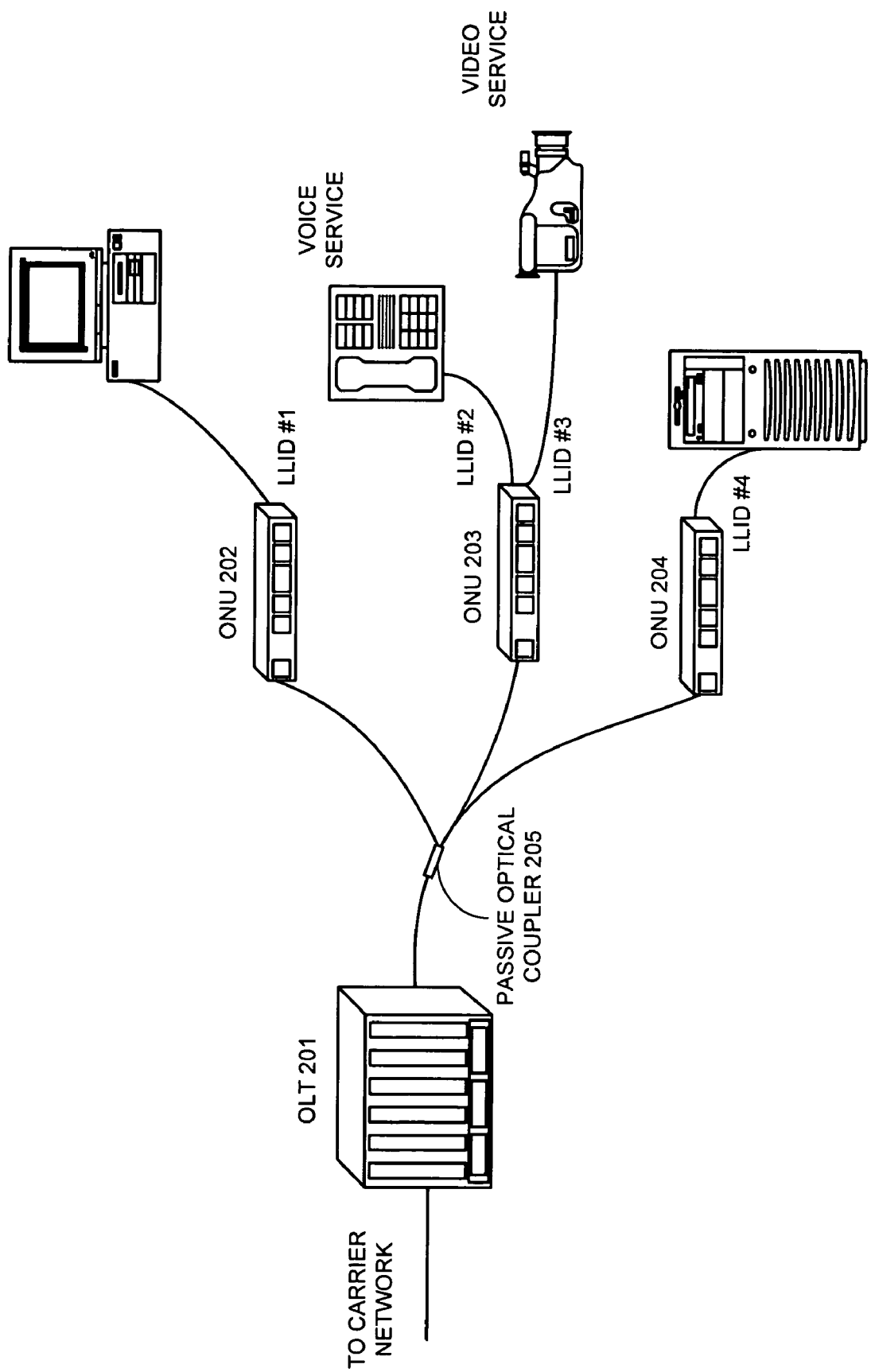
FIG. 2 illustrates a passive optical network including an OLT and ONUs (prior art).

FIG. 2 illustrates a passive optical network including an OLT and ONUs (prior art). OLT 201 is coupled with ONUs 202, 203, and 204 through optical fibers and a passive optical splitter. An ONU can accommodate a number of networked devices, such as personal computers, telephones, video equipment, network servers, etc. Note that a networked device can identify itself by using a Logical Link ID (LLID), as defined in the IEEE 802.3 standard.

Packet Switching by OLT

Figure 3:
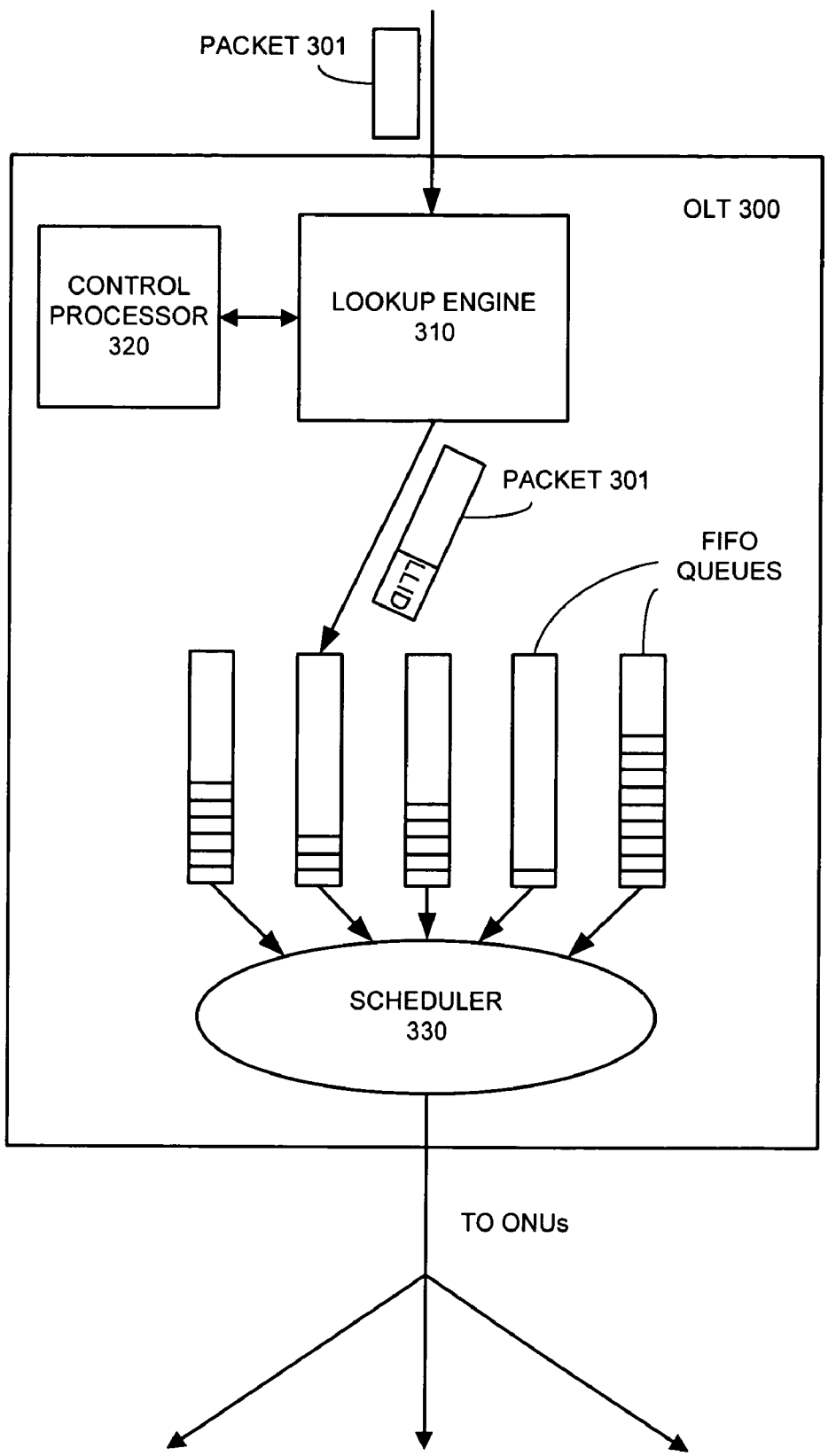
FIG. 3 illustrates packet switching by an OLT in accordance to one embodiment of the present invention.

FIG. 3 illustrates packet switching by an OLT in accordance to one embodiment of the present invention. When a downstream packet 301 arrives at OLT 300, OLT 300 is responsible for reading the header information from the packet and assigning a proper LLID to the packet. A lookup engine 310 performs the critical lookup process to determine what LLID packet 301 should have.

Accordingly, lookup engine 310 applies various forwarding policies which allow service providers to regulate the traffic. For example, lookup engine 310 can be configured to drop packets from certain IP addresses, or to give higher quality of service (QoS) to packets with a certain type-of-service (ToS) value.

Lookup engine 310 often reads several fields in packet 301's header to determine where and how to forward it. For example, in an EPON offering VLAN services, lookup engine 310 may look at packet 301's destination media access control (MAC) address and its VLAN ID to determine a proper LLID for the packet. The different forwarding policies within lookup engine 310 are typically controlled and updated by a control processor 320.

When lookup engine 310 assigns packet 301 an LLID, lookup engine 310 also determines in which first-in-first-serve (FIFO) queue packet 301 will be stored according to packet 301's QoS level. As shown in FIG. 3, a number of FIFO queues store downstream packets before they are transmitted. Scheduler 330 regularly pulls packets from each FIFO queue and transmits the packets downstream to the ONUs. By adjusting the frequency of its serving of each FIFO queue, scheduler 330 can implement different QoS levels according to service level agreements (SLAs). When packet 301 is broadcast to all the ONUs, only ONUs with an LLID that matches the LLID carried by packet 301 is allowed to receive packet 301. Thus, by labeling a packet with a proper LLID and storing the packet in a proper FIFO queue, lookup engine 310 performs a switching function while satisfying the packet's QoS requirement.

Although FIG. 3 only illustrates downstream packet switching, lookup engine 310 switches upstream packets in a similar manner. When an upstream packet arrives at lookup engine 310, tagging the packet with an LLID is usually not necessary. Lookup engine 310 typically reads the packet's source MAC address, determines a corresponding VLAN ID for the packet, and stores the packet in a proper upstream FIFO queue. Whether the packet's VLAN ID is reset based on the lookup result depends on the service provider's policy. Note that a different set of upstream FIFO queues (separate from those for downstream packets) store upstream packets. Accordingly, a separate scheduler may serve the upstream FIFO queues.

Lookup Engine

Figure 4:
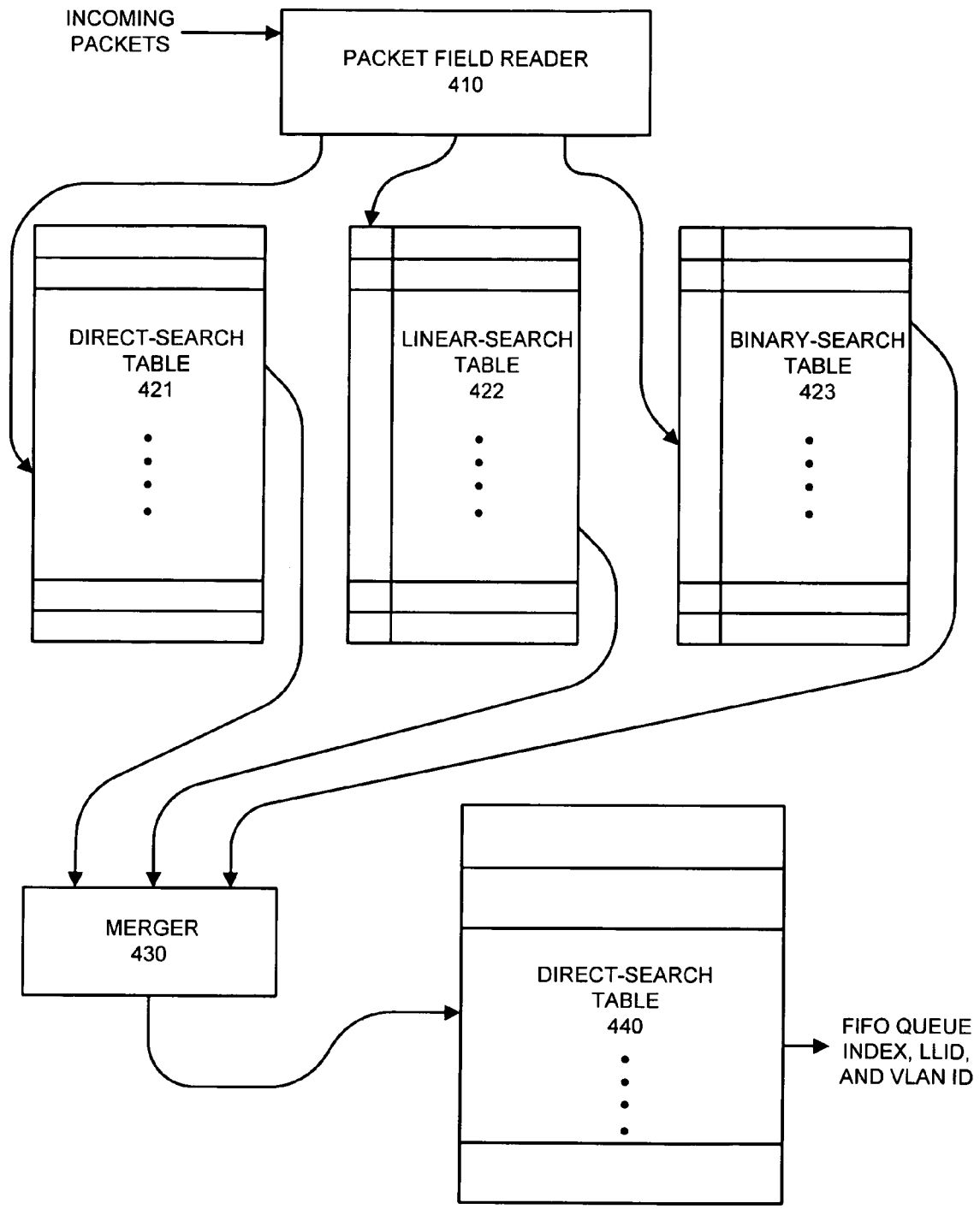
FIG. 4 illustrates lookup tables within a lookup engine in accordance to one embodiment of the present invention.

FIG. 4 illustrates lookup tables within a lookup engine in accordance to one embodiment of the present invention. A lookup engine comprises two levels of lookups. The results from the first-level lookup are merged to produce a merged value, which is used in the second-level lookup. The result from the second-level lookup indicates an LLID, a VLAN ID, and a queue index.

When a packet arrives, a packet field reader 410 selects a number of packet fields and reads their values. Typical fields may include, but are not limited to, layer-two source address (e.g., source MAC address), layer-two destination address (e.g., destination MAC address), layer-two type field, VLAN ID, layer-three source address (e.g., source IP address), layer-three destination address (e.g., destination IP address), ToS field, TCP port, UDP port, etc. In general, one can configure packet field reader 410 to read any specified number of bits at any position within a packet.

Packet field reader 410 then selects and sends certain field values to three lookup tables. This example illustrates a direct-search table 421, a linear-search table 422, and a binary-search table 423.

Direct-search table 421 is a directly addressed table. The system typically offsets a base address of the direct-search table 421 with a given field value, and retrieves the result at that offset address. In one embodiment, the system divides table 421 into a number of sub-tables, and assigns each sub-table a corresponding base address. Each sub-table can be used for a different field value. Alternatively, more than one sub-table can be used for one field value to produce multiple results, which allow more complex forwarding policies. In addition, one may reconfigure the size of a sub-table by changing its base address.

Direct-search table 421 offers fast access time, but is limited by available memory space. Hence, there is a constraint on the size of a field value, which is used as an offset to the base address.

Linear-search table 422 requires linear scanning of its keys to find an exact match of a given field value. Unlike in a direct-search table or a binary-search table, keys in linear-search table 422 do not need to be continuous or sorted. This gives linear-search table 422 great flexibility, and makes it suitable for searching any user-defined combination of bits from a packet.

A limitation of linear-search table 422 is its slow scan time, since the number of clock cycles for a complete search is proportional to the table's size. Hence, the table size is limited in a system where fast processing is mandatory for line-speed packet switching. In one embodiment, the system may include multiple parallel linear-search tables for a larger search space.

Binary-search table 423 contains entries arranged in a binary-search tree in ascending or descending order. A binary search requires at most n comparisons to search $2^n$ entries. Hence, binary-search table 423 offers a good compromise between large table size and fast search times.

The search results from all the lookup tables contain similar information. A result may include a QoS value, a destination value, a discard value, and three priority numbers associated with each value respectively. In one embodiment, a QoS value is four-bit long, a destination value is nine-bit long, the discard value is one-bit long, and each priority number is three-bit long.

Merger 430 merges the results from the three lookup tables. Note that there may be more than three sets of results to be merged. For example, if direct-search table 421 contains multiple sub-tables, each sub-table may yield a set of result. Merger 420 first compares the priorities associated with each value (QoS, destination, and discard) among all the results. Merger 420 then selects the QoS, destination, and discard values with the highest priority. If there are several values with the same highest priority level, merger 430 then performs a logical "OR" operation among them and uses the "OR" result.

For example, if there are two results whose QoS values have the same highest priority, these two QoS values are put to an "OR" operation, and merger 430 sets the highest-priority QoS value to the "OR" result. The same merge rule applies to the destination and discard values.

Next, merger 430 combines the highest-priority QoS value and destination value into a merged value, which is used to search the second-level lookup table 440. In one embodiment, merger 430 cascades the bits of the highest-priority QoS value and destination value to produce the merged value. Merger 430 then determines whether the highest-priority discard value indicates a discard. If so, merger 430 may follow a default rule to dispose the packet (e.g., dropping the packet) and discard the merged value.

Direct-search table 440 is directly addressed. The merged value produced by merger 430 offsets its base address to produce a result. This result may contain a FIFO queue index, an LLID, and a VLAN ID. If the packet is a downstream packet, it may be assigned an LLID and sent to a downstream FIFO queue according to the result of table 440. Similarly, if the packet is an upstream packet, it may be assigned a VLAN ID and sent to an upstream FIFO queue accordingly.

First-level Lookup Tables

Figure 5:
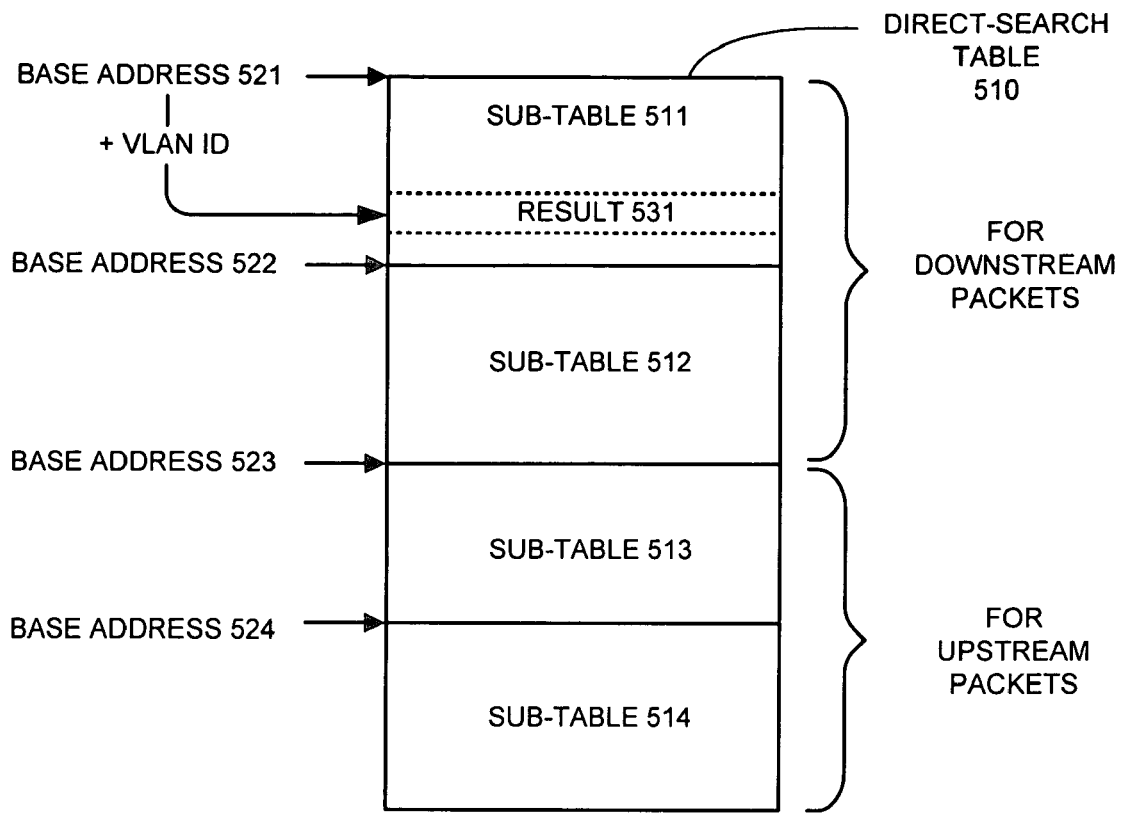
FIG. 5 illustrates a direct-search table within a lookup engine in accordance with an embodiment of the present invention.

FIG. 5 illustrates a direct-search table within a lookup engine in accordance with an embodiment of the present invention. Direct-search table 510 is divided into four sub-tables 511, 512, 513, and 514, which begin at base addresses 521, 522, 523, and 524, respectively. Sub-tables 511 and 512 are used for lookups for downstream packets, and sub-tables 513 and 514 for upstream packets.

In the illustrated example, a downstream packet's VLAN ID offsets base address 521 and produces a result 531. In one embodiment, the same VLAN ID can also offset base address 522 to produce another result, which allows the system to implement more complex rules. Alternatively, a different packet field value may offset base address 522 to produce a result corresponding to that value.

Sub-tables 523 and 524 may function similarly for upstream packets.

Figure 6:
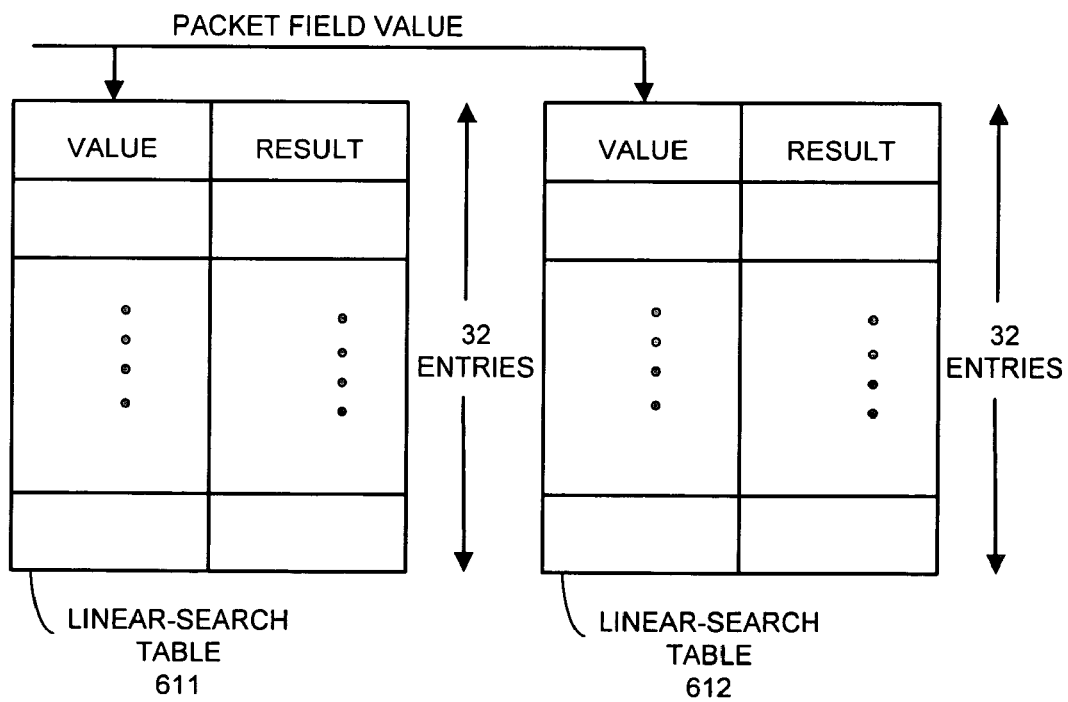
FIG. 6 illustrates linear-search tables within a lookup engine in accordance with an embodiment of the present invention.

FIG. 6 illustrates linear-search tables within a lookup engine in accordance with an embodiment of the present invention. As shown in FIG. 6, the system contains two linear-search tables, 611 and 612, in parallel. A packet field value is sent to both tables simultaneously. Because the lookup engine usually operates at a much slower clock speed relative to line speeds (typically at Gbps), and because packet processing is ideally performed in real-time to avoid queue overflow, the number of clock cycles spent on the linear search is limited. In this example, each table contains 32 entries, such that the entire search is complete within 32 clock cycles. With tables 611 and 612, a total number of 64 values can be searched.

Figure 7:
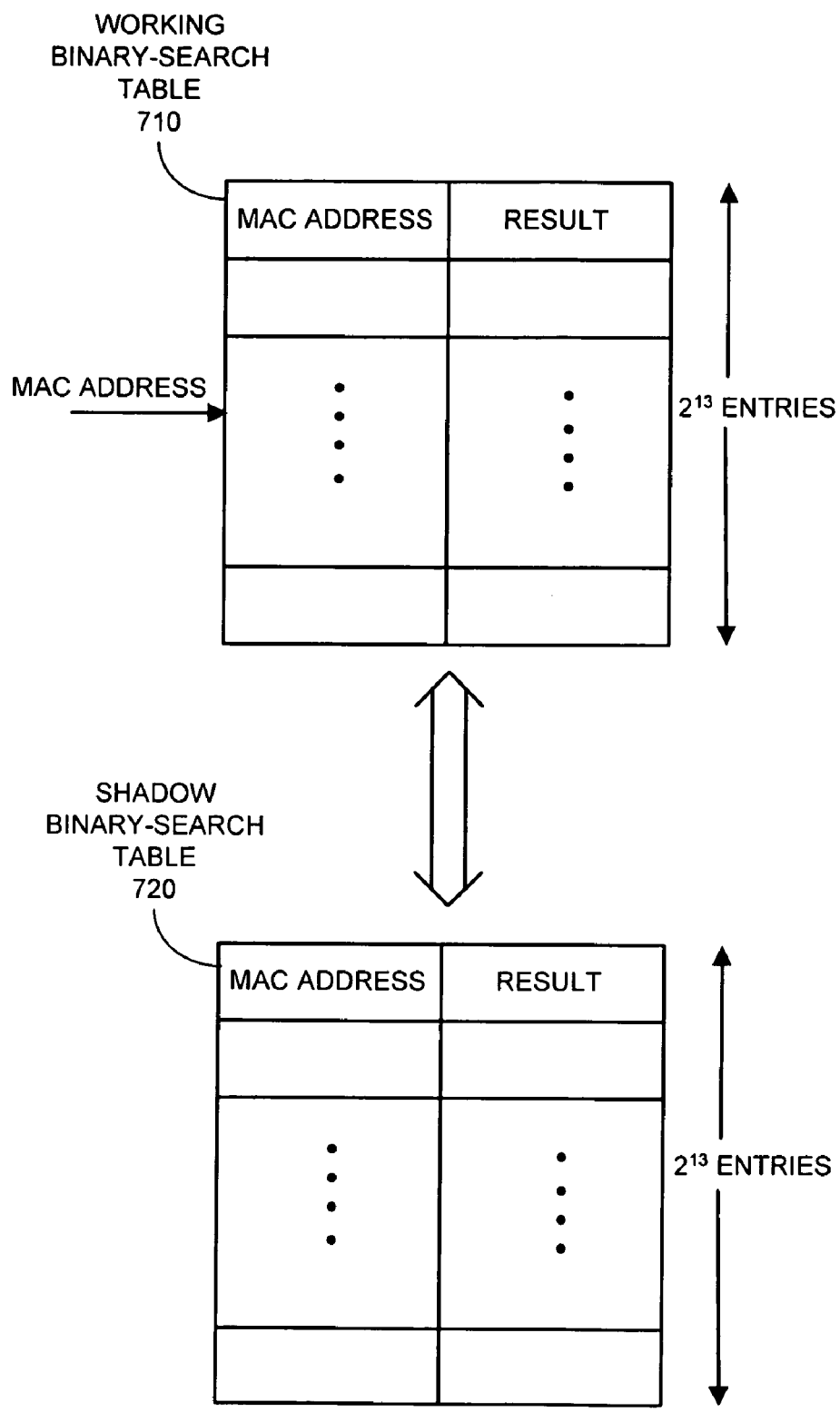
FIG. 7 illustrates a working binary-search table and a shadow binary-search table within a lookup engine in accordance with an embodiment of the present invention.

FIG. 7 illustrates a working binary-search table and a shadow binary-search table within a lookup engine in accordance with an embodiment of the present invention. The binary search in the first-level lookup can be used to search against a packet's destination (for downstream) or source (for upstream) MAC address. In EPONs, a MAC address is a device's Ethernet address, which is 48-bit long. Fortunately, a binary-search table does not need to have $2^{48}$ entries, because IEEE 802.3ah standard only requires an EPON to accommodate approximately 6,000 MAC addresses. Therefore, the size of a binary-search table may be set to $2^{13}$ entries.

When an EPON is initialized, an OLT registers a number of newly joined devices. Each device is identified by its MAC address and an associated LLID. In a binary-search table keyed to MAC addresses, all entries are in ascending or descending order. When a new device joins, a new entry corresponding to its MAC address is inserted into the existing table. When inserting the new entry, the system ensures that a logical binary-search tree is preserved.

However, since the table has only $2^{13}$ slots, and the MAC address space has $2^{48}$ potential addresses, it is possible that, when a new device joins the EPON, there is no slot available for the proper insertion of its entry (i.e., the new entry hits an occupied "leaf" in the existing logical binary-search tree). To solve this problem, the system uses a working table 710 and a shadow table 720. Working table 710 is used for regular binary-search lookups. When a new device joins, the system attempts to insert the corresponding new entry into working table 710. If there is no empty slot, the system moves all the entries in working table 710, together with the new entry, to shadow table 720. Entries in table 720 form a more balanced binary-search tree. The system then changes table 720 to a working table, and changes table 710 to a shadow table.

Figure 8:
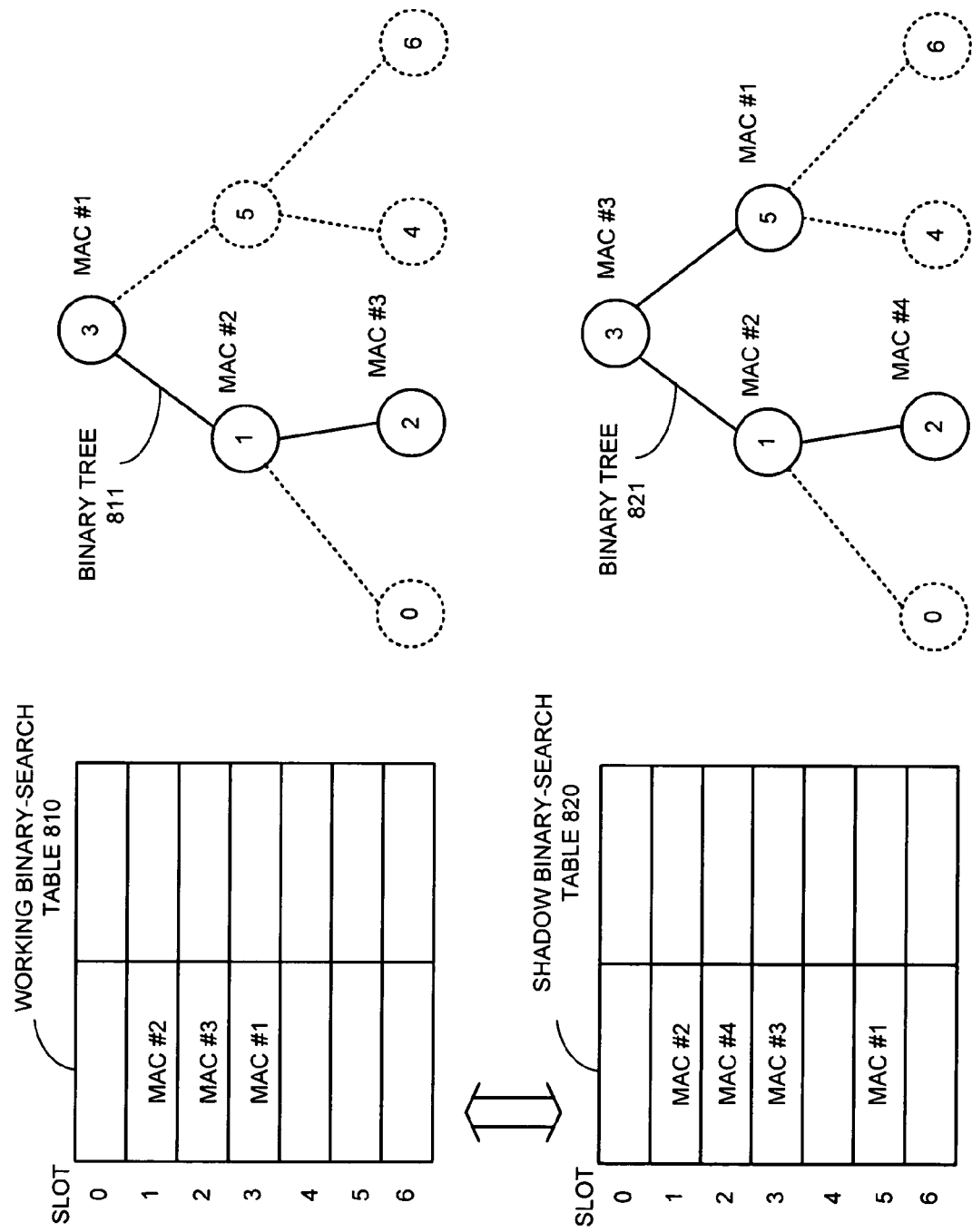
FIG. 8 illustrates balancing of the binary-search tables in accordance with an embodiment of the present invention.

FIG. 8 illustrates balancing of the binary-search tables in accordance with an embodiment of the present invention. For illustration purposes, this example assumes that a working table 810 and a shadow table 820 each contain seven slots. Binary trees 811 and 821 correspond to the arrangement of entries in tables 810 and 820, respectively. A broken circle stands for an unoccupied position in a binary tree, and a solid circle stands for an occupied position. The number within a circle corresponds to the slots position within the table. Assume that four devices join the EPON in the following order: MAC #1, MAC #2, MAC #3, and MAC #4. Also, assume that the values of the MAC addresses are in the following order: MAC #1>MAC #3>MAC #4>MAC #2.

When MAC #1 first joins, it is inserted into the middle slot (slot 3) of the empty working table 810. When MAC #2 joins, since its value is less than that of MAC #1, it is inserted into slot 1 to create the most balanced binary-search tree at that moment. When MAC #3 joins, since its value is between those of MAC #1 and MAC #2, it is inserted into slot 2, a "leaf" of binary tree 811. When MAC #4 joins, its position should be between MAC #2 and MAC #3; however, there is no empty slot left, i.e., MAC #4 hits an occupied "leaf."

When this happens, the system move all four entries to shadow table 820, and rearrange the positions of the four entries as shown in binary tree 821. In this way, a more balanced binary-search table is created. The system then changes table 820 to a working table and table 810 to a shadow table.

Merger Process

Figure 9:
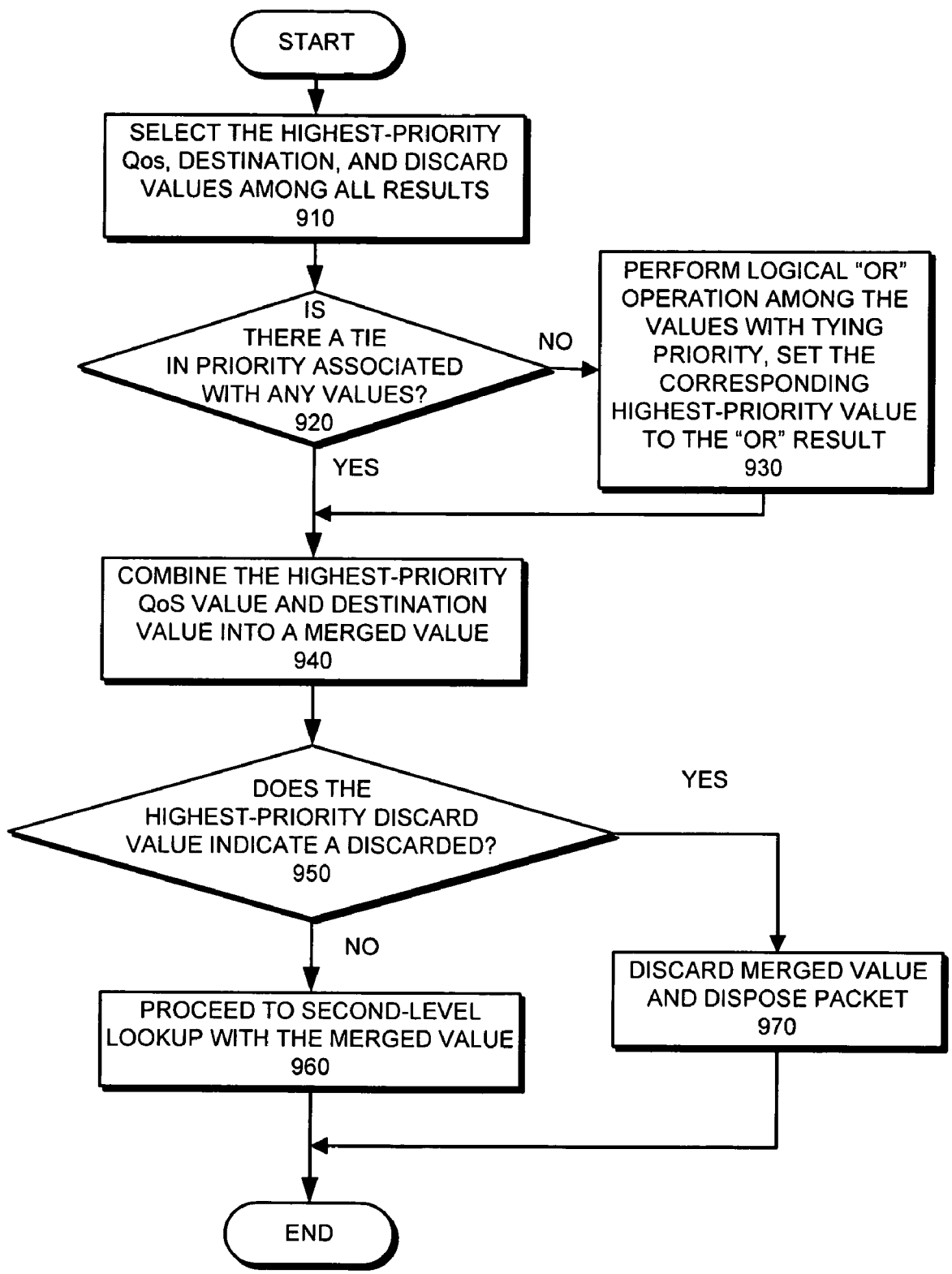
FIG. 9 presents a flow chart illustrating the merging process within a lookup engine in accordance with an embodiment of the present invention.

FIG. 9 presents a flow chart illustrating the merging process within a lookup engine in accordance with an embodiment of the present invention. Merger 430 starts by selecting the highest-priority QoS, destination, and discard values among all the results (step 910). Merger 430 then determines if there is a tie in priority associated with any values (step 920). If there is a tie, merger 430 performs a logical "OR" operation among the tying values, and sets the corresponding highest-priority value to the "OR" result (step 930). Merger 430 then combines the highest-priority QoS value and destination value into a merged value (step 940). Next, merger 430 determines whether the highest-priority discard value indicates a discard (step 950). If so, merger 430 discards the merged value and follows a default rule to dispose the packet (step 970). If not, merger 430 proceeds to second-level lookup with the merged value (step 960).

Overall Lookup Process

Figure 10:
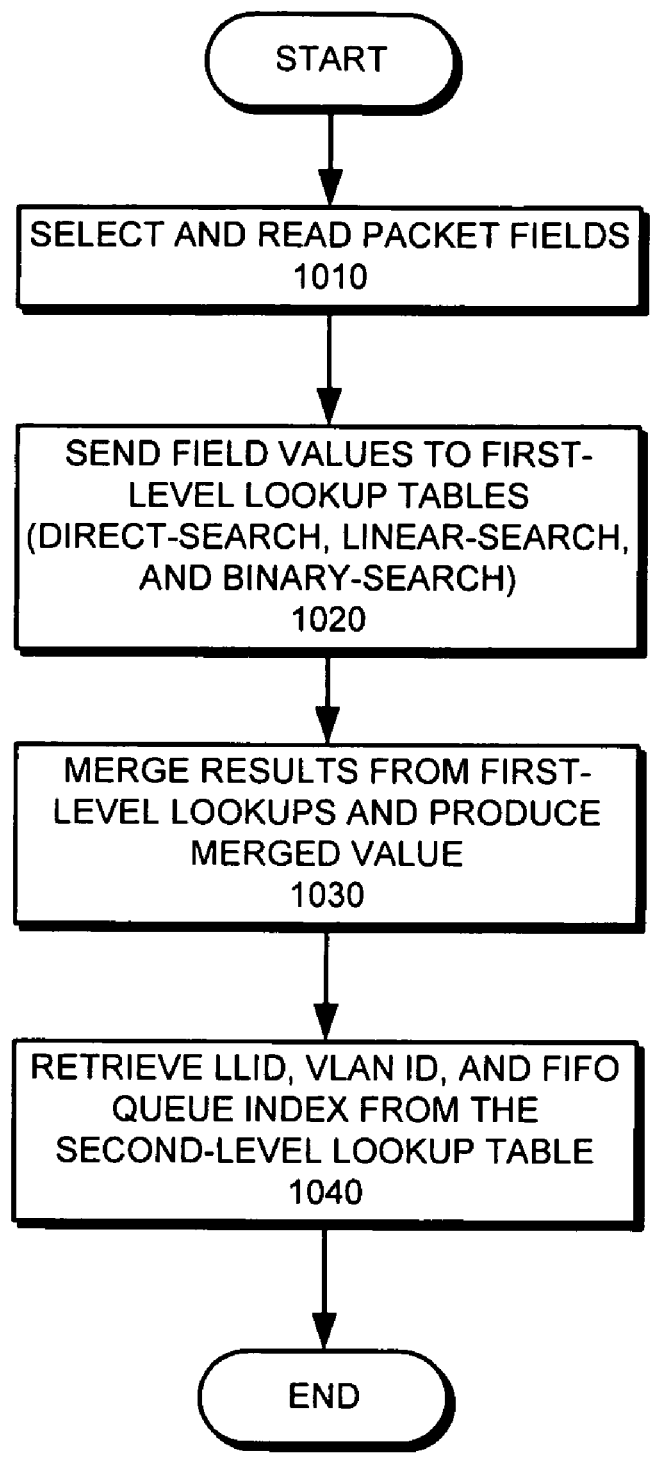
FIG. 10 presents a flow chart illustrating the lookup process in accordance with an embodiment of the present invention.

FIG. 10 presents a flow chart illustrating the lookup process in accordance with an embodiment of the present invention. The system starts by selecting and reading certain packet fields (step 1010). The system then sends certain field values to the first-level lookup tables (step 1020). Next, the system merges results from the first-level lookups and produces a merged value (step 1030). The merged value is used by the system in the second-level lookup to retrieve an LLID, a VLAN ID, and a FIFO queue index (step 1040).

What is claimed is:

1. A method for switching packets in a passive optical network which includes a central node and at least one remote node, the method comprising:
   receiving a packet at the central node;
   obtaining a first set of results by performing a first lookup based on a first set of values which include a virtual local area network (VLAN) identifier of the packet;
   wherein the first lookup involves directly addressing a direct-search table by offsetting one or more base addresses based on the first set of values;
   wherein the direct-search table is divided into sub-tables, each of which starts at a corresponding base address;
   wherein a subset of the sub-tables are used if the packet is an upstream packet;

wherein a subset of the sub-tables are used if the packet is a downstream packet;

obtaining a second set of results by performing a second lookup based on a second set of values derived from the packet;

producing a merged value by merging the first set of results and the second set of results;

obtaining a subsequent result by performing a subsequent lookup with the merged value; and if the packet is a downstream packet,
deriving a logical identifier corresponding to one or more remote nodes from the subsequent result,
incorporating the logical identifier into the packet, and
transmitting the packet to one or more remote nodes.

2. The method of claim 1, wherein the second lookup involves linearly searching one or more linear-search tables based on the second set of values; and wherein the second set of values includes a number of bits extracted from the packet.

3. The method of claim 1, further comprising producing a third set of results by performing a third lookup based on a third set of values derived from the packet; and wherein producing the merged value involves merging the first, second, and third sets of results.

4. The method of claim 3, wherein the third lookup involves a binary search through a working binary-search table based on the third set of values.

5. The method of claim 3, wherein if the packet is a downstream packet, the third set of values includes a destination media access control (MAC) address of the packet; and
wherein if the packet is an upstream packet, the third set of values includes a source MAC address of the packet.

6. The method of claim 5, wherein if the packet is an upstream packet and if the binary-search table does not contain an entry corresponding to the packet's source MAC address, the method further comprises:
inserting a new entry into the working binary-search table based on the packet's source MAC address;
wherein the key of the new entry is derived from the packet's source MAC address.

7. The method of claim 6, wherein if there is no space left in the working binary-search table for inserting the new entry, the method further comprises:
populating a shadow binary-search table with existing entries in the working binary-search table and the new entry;
converting the shadow binary-search table to an updated working binary-search table; and
converting the prior working binary-search table to a shadow binary-search table.

8. The method of claim 3, wherein each of the first, second, and third sets of results includes:
a discard value;
a quality of service (QoS) value;
a destination value; and
three priority numbers setting the priority of the discard value, QoS value, and destination value, respectively;
wherein the QoS value and destination value are used to produce the merged value; and
wherein the discard value indicates whether the merged value should be discarded.

9. The method of claim 8, wherein merging the first, second, and third sets of results to produce the merged value involves:
selecting the discard value, QoS value, and destination value with the highest priority among all the results;
if there is a tie in the priority associated with a value, performing a logical "OR" operation among the tying values and setting the corresponding value to the "OR" result;
combining the selected QoS value and destination value to produce the merged value; and
if the selected discard filed indicates that the merged value should be discarded, discarding the merged value.

10. The method of claim 1, wherein the subsequent result includes a queue index which specifies a queue where the packet can be stored before the packet is transmitted.

11. The method claim 1, wherein the subsequent result includes a logical identifier which specifies one or more remote nodes to which the packet is destined if the packet is a downstream packet.

12. The method of claim 1, wherein the subsequent result includes a VLAN identifier.

13. An apparatus for switching packets in a passive optical network which includes a central node and at least one remote node, the apparatus comprising:
a receiving mechanism configured to receive a packet at the central node;
a first lookup mechanism configured to obtain a first set of results by performing a first lookup based on a first set of values which include a virtual local area network (VLAN) identifier of the packet;
wherein the first lookup involves directly addressing a direct-search table by offsetting one or more base addresses based on the first set of values;
wherein the direct-search table is divided into sub-tables, each of which starts at a corresponding base address;
wherein a subset of the sub-tables are used if the packet is an upstream packet;
wherein a subset of the sub-tables are used if the packet is a downstream packet;
a second lookup mechanism configured to obtain a second set of results by performing a second lookup based on a second set of values derived from the packet;
a merging mechanism configured to produce a merged value by merging the first set of results and the second set of results;
a subsequent lookup mechanism configured to obtain a subsequent result by performing a subsequent lookup with the merged value; and
a transmission mechanism; wherein if the packet is a downstream packet, the transmission mechanism is configured to:
derive a logical identifier corresponding to one or more remote nodes from the subsequent result;
incorporate the logical identifier into the packet; and
transmit the packet to one or more remote nodes.

14. The apparatus of claim 13, further comprising one or more linear-search tables;
wherein the second lookup mechanism is further configured to linearly search the one or more linear-search tables based on the second set of values; and
wherein the second set of values includes a number of bits extracted from the packet.

15. The apparatus of claim 13, further comprising a third lookup mechanism configured to produce a third set of results by performing a third lookup based on a third set of values derived from the packet; and
wherein the merging mechanism is further configured to merge the first, second, and third sets of results.

16. The apparatus of claim 15, further comprising a working binary-search table; and wherein the third lookup mechanism is further configured to perform a binary search through the working binary-search table based on the third set of values.

17. The apparatus of claim 15, wherein if the packet is a downstream packet, the third set of values includes a destination media access control (MAC) address of the packet; and
wherein if the packet is an upstream packet, the third set of values includes a source MAC address of the packet.

18. The apparatus of claim 17, wherein if the packet is an upstream packet and if the binary-search table does not contain an entry corresponding to the packet's source MAC address, the third lookup mechanism is further configured to:
insert a new entry into the working binary-search table based on the packet's source MAC address;
wherein the key of the new entry is derived from the packet's source MAC address.

19. The apparatus of claim 18, wherein if there is no space left in the working binary-search table for inserting the new entry, the third lookup mechanism is further configured to:
populate a shadow binary-search table with existing entries in the working binary-search table and the new entry, wherein the distribution of entries in the shadow binary-search table is more balanced than the working binary-search table;
convert the shadow binary-search table to an updated working binary-search table; and
convert the prior working binary-search table to a shadow binary-search table.

20. The apparatus of claim 15, wherein each of the first, second, and third sets of results includes:
a discard value;
a quality of service (QoS) value;
a destination value; and
three priority numbers setting the priority of the discard value, QoS value, and destination value, respectively;
wherein the QoS value and destination value are used to produce the merged value; and
wherein the discard value indicates whether the merged value should be discarded.

21. The apparatus of claim 20, wherein the merging mechanism is further configured to:
select the discard value, QoS value, and destination value with the highest priority among all the results;
if there is a tie in the priority associated with a value, perform a logical "OR" operation among the tying values and set the corresponding value to the "OR" result;
combine the selected QoS value and destination value to produce the merged value; and
if the selected discard filed indicates that the merged value should be discarded, discard the merged value.

22. The apparatus of claim 13, wherein the subsequent result includes a queue index which specifies a queue where the packet can be stored before the packet is transmitted.

23. The apparatus of claim 13, wherein the subsequent result includes a logical identifier which specifies one or more remote nodes to which the packet is destined if the packet is a downstream packet.

24. The apparatus of claim 13, wherein the subsequent result includes a VLAN identifier.

25. A computer-readable storage medium storing instructions that when executed caused by a computer cause the computer to perform a method for switching packets in a passive optical network which includes a central node and at least one remote node, the method comprising:
receiving a packet at the central node;
obtaining a first set of results by performing a first lookup based on a first set of values which include a virtual local area network (VLAN) identifier of the packet;
wherein the first lookup involves directly addressing a direct-search table by offsetting one or more base addresses based on the first set of values;
wherein the direct-search table is divided into sub-tables, each of which starts at a corresponding base address;
wherein a subset of the sub-tables are used if the packet is an upstream packet;
wherein a subset of the sub-tables are used if the packet is a downstream packet;
obtaining a second set of results by performing a second lookup based on a second set of values derived from the packet;
producing a merged value by merging the first set of results and the second set of results;
obtaining a subsequent result by performing a subsequent lookup with the merged value; and
if the packet is a downstream packet,
deriving a logical identifier corresponding to one or more remote nodes from the subsequent result,
incorporating the logical identifier into the packet, and
transmitting the packet to one or more remote nodes.

26. The computer-readable storage medium of claim 25, wherein the second lookup involves linearly searching one or more linear-search tables based on the second set of values; and wherein the second set of values includes a number of bits extracted from the packet.

27. The computer-readable storage medium of claim 25, wherein the method further comprises producing a third set of results by performing a third lookup based on a third set of values derived from the packet; and wherein producing the merged value involves merging the first, second, and third sets of results.

28. The computer-readable storage medium of claim 27, wherein the third lookup involves a binary search through a working binary-search table based on the third set of values.

29. The computer-readable storage medium of claim 27, wherein if the packet is a downstream packet, the third set of values includes a destination media access control (MAC) address of the packet; and
wherein if the packet is an upstream packet, the third set of values includes a source MAC address of the packet.

30. The computer-readable storage medium of claim 29, wherein if the packet is an upstream packet and if the binary-search table does not contain an entry corresponding to the packet's source MAC address, the method further comprises:
inserting a new entry into the working binary-search table based on the packet's source MAC address;
wherein the key of the new entry is derived from the packet's source MAC address.

31. The computer-readable storage medium of claim 30, wherein if there is no space left in the working binary-search table for inserting the new entry, the method further comprises:
populating a shadow binary-search table with existing entries in the working binary-search table and the new entry, wherein the distribution of entries in the shadow binary-search table is more balanced than the working binary-search table;
converting the shadow binary-search table to an updated working binary-search table; and
converting the prior working binary-search table to a shadow binary-search table.

32. The computer-readable storage medium of claim 27, wherein each of the first, second, and third sets of results includes:

a discard value;

a quality of service (QoS) value;

a destination value; and three priority numbers setting the priority of the discard value, QoS value, and destination value, respectively;

wherein the QoS value and destination value are used to produce the merged value; and wherein the discard value indicates whether the merged value should be discarded.

33. The computer-readable storage medium of claim 32, wherein merging the first, second, and third sets of results to produce the merged value involves:

selecting the discard value, QoS value, and destination value with the highest priority among all the results;

if there is a tie in the priority associated with a value, performing a logical "OR" operation among the tying values and setting the corresponding value to the "OR" result;

combining the selected QoS value and destination value to produce the merged value; and if the selected discard filed indicates that the merged value should be discarded, discarding the merged value.

34. The computer-readable storage medium of claim 25, wherein the subsequent result includes a queue index which specifies a queue where the packet can be stored before the packet is transmitted.

35. The computer-readable storage medium of claim 25, wherein the subsequent result includes a logical identifier which specifies one or more remote nodes to which the packet is destined if the packet is a downstream packet.

36. The computer-readable storage medium of claim 25, wherein the subsequent result includes a VLAN identifier.

* * * * *